US007375673B2

(12) United States Patent
Spilo

(10) Patent No.: US 7,375,673 B2
(45) Date of Patent: May 20, 2008

(54) SYSTEM AND METHOD FOR UNIVERSAL REMOTE CONTROL CONFIGURATION

(75) Inventor: Michael Spilo, Greenwich, CT (US)

(73) Assignee: Netgear, Inc., Santa Clara, CA (US)

( * ) Notice: Subject to any disclaimer, the term of this patent is extended or adjusted under 35 U.S.C. 154(b) by 92 days.

(21) Appl. No.: 11/035,484

(22) Filed: Jan. 13, 2005

(65) Prior Publication Data
US 2006/0152401 A1 Jul. 13, 2006

(51) Int. Cl.
H04L 17/02 (2006.01)
(52) U.S. Cl. ............... 341/176; 341/173; 340/825.69; 340/825.72; 348/734
(58) Field of Classification Search ............... 341/176, 341/174, 175, 177, 178; 340/825.69, 825.72, 340/825.22; 348/569, 734; 345/173, 169; 715/744; 725/38
See application file for complete search history.

(56) References Cited

U.S. PATENT DOCUMENTS 6,130,625 A * 10/2000 Harvey ............... 340/825.72
6,384,737 B1 * 5/2002 Hsu et al. ............. 340/825.69
6,496,122 B2 12/2002 Sampsell
6,559,866 B2 5/2003 Kolde et al.
6,822,698 B2 * 11/2004 Clapper ............... 348/734
RE39,059 E * 4/2006 Foster ............... 715/744
7,091,898 B2 * 8/2006 Arling et al. ............. 341/176
7,224,903 B2 * 5/2007 Colmenarez et al. ....... 398/106
2004/0155793 A1 8/2004 Mui
2004/0189591 A1 9/2004 Breuil

OTHER PUBLICATIONS

PCT International Search Report for International Application No. PCT/US05/46916, dated Oct. 4, 2006.

* cited by examiner

Primary Examiner—Davetta W. Goins
Assistant Examiner—Sisay Yacob
(74) Attorney, Agent, or Firm—Darby & Darby P.C.

(57) ABSTRACT

A controller is connected to one or more media devices. Each media device includes an associated native remote control. The controller includes a data store comprising one or more descriptions of remote control protocols. The user presses a button on the native remote control. The controller receives a resulting signal and compares the signal against the stored remote control protocols. After at least one and preferably less than three key presses, the controller identifies a single remote control protocol associated with the received signals, and thus identifies the media device whose remote control is being used. The user may subsequently use a controller remote control to issue commands to the media device through the controller. The controller may identify a plurality of media devices, and allow the user to issue complex commands. The controller may receive updates to its data store from a server through a network connection.

34 Claims, 5 Drawing Sheets

SYSTEM AND METHOD FOR UNIVERSAL REMOTE CONTROL CONFIGURATION

BACKGROUND OF THE INVENTION

Due to current advances of the electronics industry, consumer media devices are steadily increasing in number and complexity. Many of today's living rooms are equipped with several interoperating consumer media devices, such as, for example, a television set, external speakers, a VCR, a DVD player, and others.

Many of these devices are controlled by a remote control. Thus, the average consumer is often forced to handle multiple remote controls, in order to configure various devices. This often results in confusion and frustration. In an attempt to address this problem, the remote controls of some devices are configured to operate with other devices. For example, a television remote control may be configured to interoperate with a VCR as well. In addition, universal remote controls have been developed. A universal remote control is designed to operate with a large number of devices.

However, the remote control functionalities of various consumer media devices differ based on the manufacturer of the device, the type of the device and other factors. Thus, different devices accept remote instructions based on different protocols. Therefore, a remote control which operates with different types of devices, must be able to operate according to different communications protocols. In order to select the correct communications protocol, the remote control must be configured with the type of device it is meant to operate with. Many remote control manufacturers allow a consumer to manually select or enter certain predefined codes into a remote control, the codes being associated with particular devices owned by the consumer. Other remotes can record or "learn" codes, by pressing keys on an original remote in order to program a new remote. However, such practices are complicated and burdensome for many consumers.

Typically, several interoperating consumer devices may be integrated into a home entertainment system. Such a system may include, e.g. an audio receiver or audiovisual control center, TV and/or video monitor, playback devices such as CD, DVD, video and/or MP3 players. There may be cable, satellite and/or broadcast inputs. There may also be one or more computers, and the system may be part of or interfaced with a network. A home entertainment system requires seamless cooperation between the various devices it comprises. Such integration may be difficult to achieve in view of the large variety of media devices available on the market today. Some manufacturers offer pre-packaged home entertainment systems. Thus, the manufacturer may ensure that the various components of the system operate seamlessly together. However, such systems may not take advantage of the competitiveness of the home entertainment market. For example, a consumer may determine that a television set produced by a first manufacturer is the best choice, but may prefer a VCR produced by a second manufacturer. In this event, the consumer must assemble a heterogeneous entertainment system. Each device is typically controlled by its own remote control, which does not operate or may only partially operate other devices, especially those by other manufacturers. Thus, assembling and using a heterogeneous entertainment system may present a daunting task.

U.S. Pat. No. 4,626,848 issued to Ehlers and hereby incorporated by reference describes a remote control that may be configured to operate with different devices. Ehlers teaches a remote control which can replace an existing remote control by "learning" its functionality. A user must place a remote control to be replaced in communication with the Ehlers remote control and press each button of the remote control to be replaced, as well as an associated button on the Ehlers remote control. The Ehlers remote control receives the signals from the remote control to be replaced and saves them, thus "learning" the functionality of that remote control. The Ehlers remote control may be thus configured with the functionality of several other remote controls, and be used with a variety of devices.

Configuring the Ehlers remote control may be a tedious procedure and may confuse many consumers. Inadvertent errors in the way the consumer configures the remote control (such as pressing the wrong button) can result in saving the incorrect data, and subsequent incorrect operation. And since the consumer is required to press many buttons in exact sequence, such errors are likely. Furthermore, the Ehlers remote control is used to directly control each individual media device, and merely replaces the remote control that was originally provided with such device. Thus, the Ehlers remote control may not be used to automatically perform more complex home entertainment system functions, which may require issuing multiple commands to one or more devices. Note particularly that each and every key and function of a native remote must be independently "learned" by the Ehlers remote. There is no data store of remote protocols, nor is any media device identified. Codes are simply copied, one by one, by a user.

U.S. Pat. No. 4,774,511 issued to Rumbolt et al. discloses a "universal" remote control which requires that a user be able to manually select the model of the media device he/she is controlling. U.S. Pat. No. 4,626,847 issued to Zato discloses a remote control device, which allows a user to control several media devices by manually selecting the device to be controlled. The Zato remote control is not able to control a wide range of devices, it is intended for a few media devices that are produced by the same manufacturer such as, for example, a ZENITH television set and a ZENITH VCR. U.S. Pat. No. 4,566,034 issued to Harger discloses a remote control which allows the manufacturer to easily specify the device or devices to which the remote control operates by permanently wiring certain leads of an integrated circuit to logical "0" or "1". This step is performed as part of the manufacturing process. Once the remote control is shipped to the consumer, it is only capable of controlling a single device, or a small number of devices upon manual selection by the user.

U.S. Pat. No. 4,703,359 issued to Rumbolt et al. (referred to as Rumbolt II herein) and hereby incorporated by reference describes a remote control that includes means for identifying devices. The Rumbolt II remote control allows the user to initiate an identifying stage. During the identifying stage, the remote control attempts to perform a simple action (such as "channel up") on a device of a predefined general type (such as a television set). The remote control sends a sequence of several remote control codes which are associated with this action in various remote control protocols. The user observes the device and indicates to the remote control when the correct action has been executed by the device (i.e., the channel has been changed). The remote control then selects the protocol of the last send code as the protocol to be used by the device and thus "identifies" the device.

The Rumbolt II identification process is relatively complex and thus prone to user error. For example, since the remote control sends the various codes in sequence, the timing of the user's response is significant. If the user waits too long to indicate that the action has been performed, the remote control may have reached the next code in the sequence which will therefore incorrectly identify the remote control protocol. On the other hand, if the remote control is configured to wait a long time after each code is sent in order to allow the user sufficient time for response, the identification process is likely to be time consuming which may cause dissatisfaction in users.

Furthermore, the Rumbolt II identification process relies on continuous communication between the remote control and the device. However, the infrared (1R) communication method disclosed by Rumbolt II is prone to frequent interruptions of communication due to misalignment of the IR ray produced by the remote control in relation to the media device. In normal use, misalignment does not present a significant problem for IR remote controls, because the user has immediate feedback as to whether the media device is receiving the remote control signals, and can realign the remote control accordingly. However, the Rumbolt II identification process does not provide such feedback. Thus, if the IR ray of the Rumbolt II remote is misaligned during the identification process, the remote may incorrectly indicate that the media device being identified is not supported.

Finally, the Rumbolt II remote cannot uniquely identify remote control protocols. There are distinct remote control protocols that share remote control codes for certain actions. This is especially true for often used actions, such as "channel up". However these remote control protocols usually have different remote control codes for other actions, such as, for example, the menu functions. Thus, the protocol identified by the Rumbolt II remote control is not necessarily compatible with all remotely controllable actions offered by the identified media device.

A controller is a device that connects with one or more consumer media devices, and integrates these devices in a home entertainment system. A controller usually makes the assembly of a home entertainment system easier, as it is usually designed to correctly interoperate with a large number of devices. A controller may provide additional functions such as play back of digital media, connection to a computer network, etc. Furthermore, a controller may ease the user experience by providing a single point of control for the user. For this reason, controllers are often sold with associated remote controls, e.g. an infrared or RF handheld device. However, it remains necessary for a user to identify the various devices of the home entertainment system to the controller.

U.S. Pat. No. 6,239,718, issued to Hoyt and hereby incorporated by reference describes a controller which connects to various media devices by means of an infrared (IR) repeater. Like Ehlers, a user configures the controller to communicate with an external device by pressing one or more buttons on a remote control associated with the external device. The user must press enough buttons to perform a predefined action. The action is usually changing a channel. The controller may request the user to perform several actions (using, for example, channel numbers with one, two and three digits). The controller saves the received signals for each performed action and, thus "learns" to perform the action itself.

The controller of Hoyt requires that the user be able to correctly perform a predefined action on an external device. This may not be as simple as it seems. For example, it is possible (even likely) that, when a user purchases a new controller, he/she purchases other media devices as well. Thus, the user may not be familiar with the devices and may not know how to correctly perform the prescribed actions on them. And since the user may need to configure the controller in order to operate the other media devices, the user may not be able to visually confirm that he is sending the correct commands. Furthermore, the Hoyt controller learns basic procedures (such as changing the channel) which is assumed by Hoyt to be common to most if not all media devices. Hoyt does not describe how a controller may learn more esoteric features which are not present for all media devices.

Because user identification of devices connected to a controller may be unreliable, existing controllers often do not feature advanced functionality, which is more likely to cause problems if attached media devices are incorrectly identified. For example, overlapping codes may allow certain basic function of a misidentified device to operate, while advanced functions would fail.

What is needed is a controller that is able to identify and control connected media devices in a simple, easy and reliable manner.

SUMMARY OF THE INVENTION

Disclosed is a system for identifying and controlling one or more media or media devices. The system comprises a controller. The controller further comprises one or more control receptors configured to receive signals from one or more native remote controls. Each native remote control is associated with at least one of the media devices. The controller also includes a processor connected to the control receptors and a memory, connected to the processor. The memory comprises one or more device entries, e.g. as records of a database. Each device entry includes information describing a remote control protocol associated with at least one native remote control. The memory further comprises computer executable instructions. The instructions are such that when they are executed by the processor they cause the controller to (a) receive one or more signals from one of the native remote controls through the control receptors and (b) identify the media device associated with the native remote control based on the received signals and the device entries.

In other embodiments, the system also comprises a controller remote control, which allows the user to control the media devices through the controller. In addition, the controller may comprise one or more control transmitters for transmitting control signals to the media devices. Transmission may be wireless or wired, direct or via a network, or by another transmission method. The controller may also comprise one or more data interfaces for receiving and sending data to and from the various media devices, and a network interface for communicating with remote computers. The data interface may be used to update the controller by downloading additional device entries from a remote server.

Also disclosed is a method for identifying a first media device having an associated first remote control protocol and an associated native remote control. One or more remote control protocols are predefined (saved) at a controller. A user is prompted to press a specified key on the native remote control, e.g. for volume down or channel up, etc. A signal is received from the native remote control at the controller as a result of the key press. The signal is compared with the one or more predefined remote control protocols, and the set of remote control protocols which match or are compatible with the signal are identified. These steps may be repeated, allowing the user to press additional keys in order to identifying successively smaller set of remote control protocols compatible with all the received signals, until a single compatible protocol is identified. The single compatible protocol is then associated with the first media device. This procedure may be repeated with several media devices.

The keys which the user is prompted to press are referred to as the identification keys. Identification keys may be predefined and stored in the controller's memory, or automatically selected by the controller.

Once an media device is associated with a predefined remote control protocol the user may issue commands to that device through the controller by using a controller remote control. The controller receives a command from the controller remote control, translates the command to the associated remote control protocol, and sends the command to the media device.

These and other aspects, features, steps and advantages can be further appreciated from the accompanying drawing Figures and description of certain illustrative embodiments.

DEFINITIONS OF KEY TERMS

Figure 1:
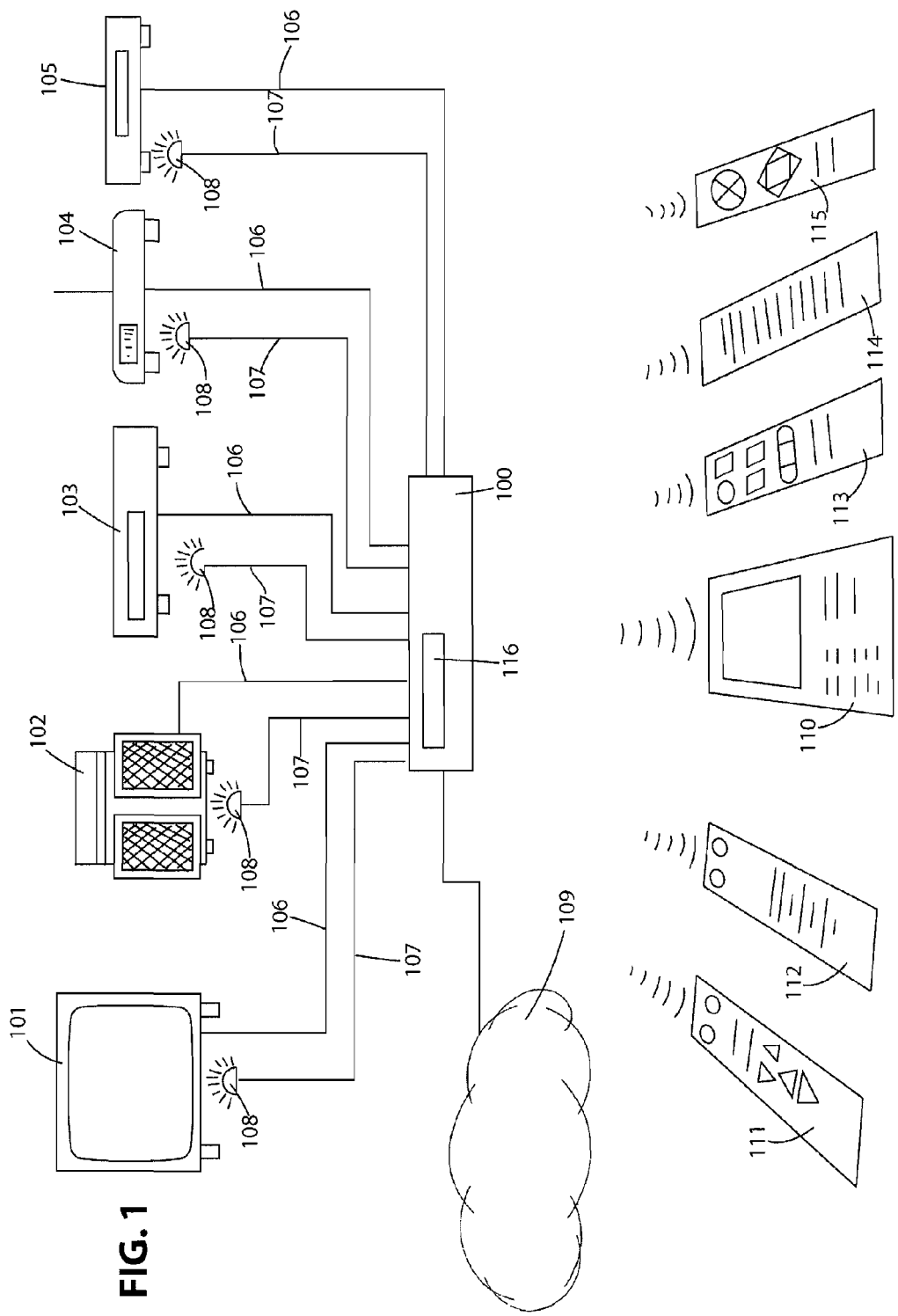
FIG. 1 shows an exemplary controller based home entertainment system.

Action—media device behavior which may be caused by using the native remote control of the media device. An action may be caused by pressing one or more keys of the native remote. Examples include "change volume", "change channel", etc.

Complex action—an action that requires that the controller issue several commands to one or more devices as a result of a single command issued to the controller by the user. A complex action may also require routing of data streams to and from the devices.

Controller—a device for controlling a plurality of media devices.

Controller remote/controller remote control—a remote control device designed to operate with the controller.

Control receptor—an element of a controller or a media device used for receiving remote control signals.

Control transmitter—an element of a controller used for sending control signals to a media device. Preferably, the control transmitter emulates the remote control which is native to the media device.

Data store—a data structure saved in the memory of the controller.

Device data router—an element of the controller that is used to route streams of data between media devices attached to the controller.

Device entry—an entry in the Data Store comprising information associated with a particular media device.

Identification key—a key on a remote control, used to identify the media device native to that remote control. A user is prompted to press one or more identification keys in order to identify a media device.

Media device—a consumer device for presentation of various media. Examples include a television set, a VCR, a DVD player, an audio system, etc.

Native remote/native remote control—a remote control device that is not specifically designated for use with the controller. It is preferable but not required that a native remote is associated with a specific media device, or a narrow range of media devices.

Remote control code—data comprised by a single communication between a remote control and an associated device. A remote control code is usually sent in response to the pressing of a remote control button by a user.

Remote control signal—a signal which comprises a remote control code encoded therein. The remote control signal is typically emitted by a remote control and received by a device associated with that remote control.

Remote control protocol—a set of rules defining the interaction between a remote control and its associated device. May take the form of a listing of a plurality of remote control codes and actions associated with them. May also include more complex rules.

DETAILED DESCRIPTION OF THE ILLUSTRATIVE EMBODIMENTS

By way of overview and introduction, presented is a controller for controlling one or more connected media devices. The controller identifies the media devices, and allows a user to control them, by sending commands through a single remote associated with the controller. The commands are received and processed by the controller, which then generates and transmits proper commands to the one or more media devices.

In reference to an embodiment of the present invention, FIG. 1 shows a controller based home entertainment system. Controller 100 is connected to a plurality of media devices. These may include but are not limited to television set 101, audio system 102, VCR 103, cable receiver 104, and DVD player 105. Other devices, such as a digital A/V recorder and a personal computer may also be connected.

The devices are connected to controller 100 by a plurality of connections 106. Connections 106 transmit data and/or signals, such audio and/or visual signals between the corresponding devices and the controller. The connections may be wireless or wired, and the signals may be analog or digital. While data connections 106 are presently shown as a plurality of cables, they may be implemented in other known methods. For example, data connections 106 may be wireless or may be implemented on a single "bus" type cable.

Controller 100 performs a variety of functions which enhance the entertainment value of devices 101-105. These functions may include, for example, routing data such as audio and video signals through connections 106, and issuing appropriate instructions to one or more devices. For example, controller 100 may turn on VCR 103, route the video signal of VCR 103 to television set 101, the audio signal from VCR 103 to audio system 102, and configure television set 101 to receive and display the video signal received from VCR 103 in response to a single command from a user.

In addition, controller 100 may perform digital recording, digital playback, and/or connect to a digital network 109 to retrieve and play content, transmit previously recorded content, upgrade the controller's software and others. Digital network 109 may be, for example, a group of one or more computer networks, such as a local area network, a wide area network and/or the Internet. Communications with digital network 109 may be performed according to a variety of known communication protocols such as TCP/IP, or WAP. The connection between controller 100 and digital network 109 may be achieved by wires or wirelessly.

Optionally, controller 100 includes an on board display 116 for displaying information and/or instructions to the user.

FIG. 1 shows several remote controls. Remote controls 111, 112, 113, 114 and 115 are native remote controls. A native remote control is a remote control that is not specifically designated for use with the controller. It is preferable that native remote controls 111, 112, 113, 114, and 115 are associated with devices 101, 102, 103, 104, and 105 respectively. For example, each native remote control may be designed to primarily operate with its respective device. Thus, the native remote controls may ship with their associated devices. Remote controls 111, 112, 113, 114, and 115 may use a variety of communication methods. Currently, infrared (IR) communication is most commonly used in conjunction with media devices. It is preferred that remote controls 111, 112, 113, 114, and 115 are not used in the ordinary operation of controller 100. However, they are used for configuring the controller.

Remote control 110 is the native remote control for controller 100. While it is possible that one of the above discussed remote controls be used to provide commands to the controller, in the preferred embodiment only remote control 110 is used for this purpose. Remote control 110 preferably uses radio waves in the [Please specify frequency] band to communicate with controller 100. However, other communication means may be used, such as, for example, infrared, ultrasound, microwave, or laser. Remote control 110 communicates through a controller protocol, which may be different than the protocols used by the native remote controls.

Control connections 107 connect controller 100 to control transmitters 108. Control transmitters 108 are used to control the devices, by emulating each device's native remote control. Since most current media devices receive IR signals from their native remote controls, control transmitters 108 are most typically IR transmitters. Naturally, if any of devices 101-105 use a different method of communication with their native remote controls, a corresponding type of control transmitter would be used. Since many media devices have mutually compatible or overlapping transmission types, one control transmitter 108 may be optionally used for a plurality of devices.

In order to emulate native remote controls, controller 100 must identify each of devices 101-105 before it can begin normal operation.

Figure 2:
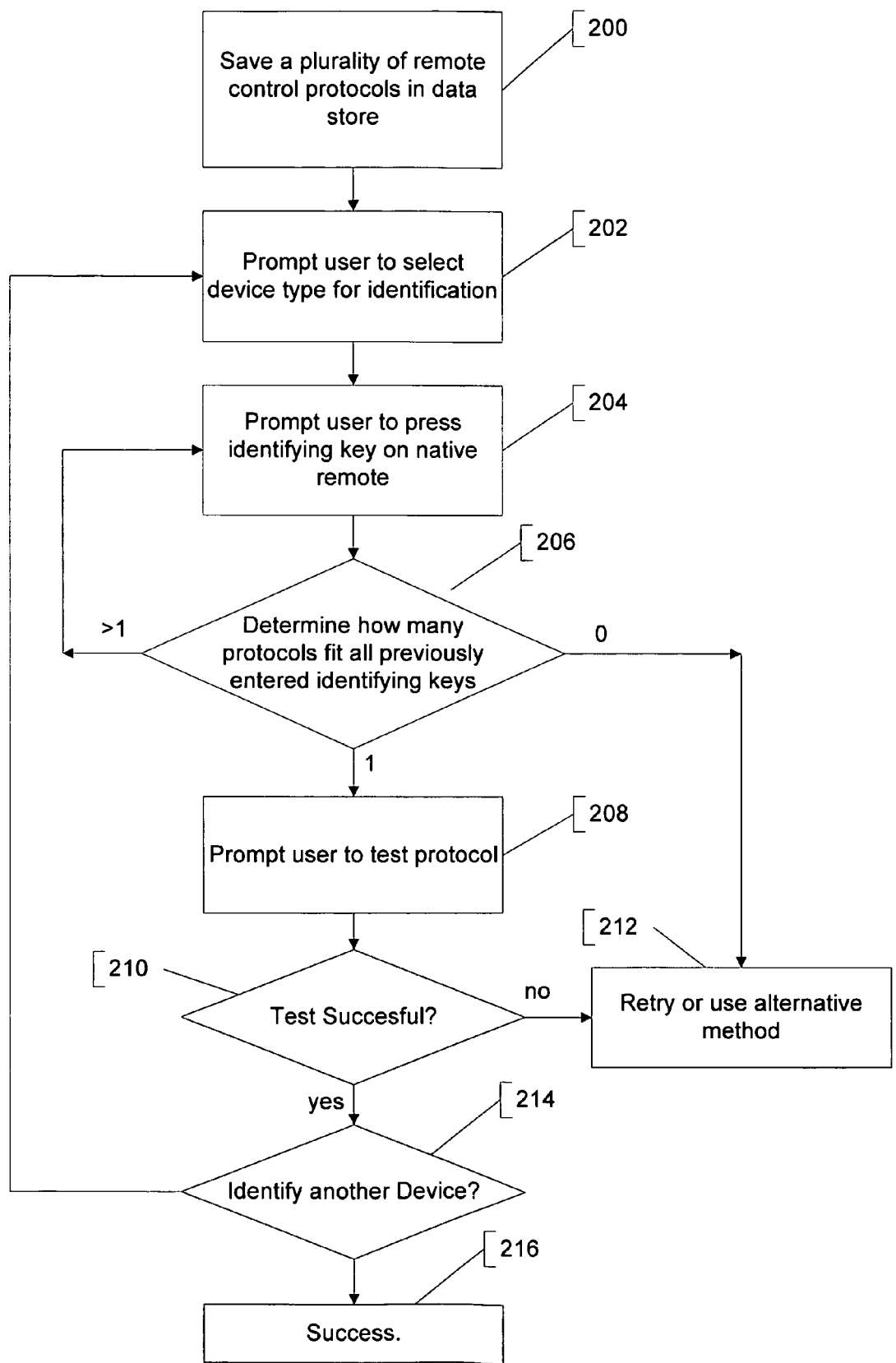
FIG. 2 is a flow chart showing how the controller identifies the devices connected to it.

FIG. 2 is a flowchart showing how the controller identifies devices 101-105. In step 200, the remote control protocols of a plurality of devices are saved in a data store in the controller. It is preferred that this step is performed before the controller is shipped to customers. However, the data store may be populated or updated at any later time, e.g. by connection to a network, such as the Internet, for downloading protocol information. The remote control protocol for a device may be saved by saving an identifier for each key of the native remote control for that device, and saving the code that is emitted by the native remote control as a result of pressing each corresponding key. It is preferred that all commonly used remote control protocols are thus saved in the controller's data store. However, there need not be an entry for each device on the market, as many devices share remote control protocols.

In order to save the remote control protocols before shipping the controller to a customer the controller's manufacturer must be in possession of these protocols. The manufacturer may obtain the protocols from the manufacturers of the various media devices. Alternatively, the manufacturer may obtain the protocols by obtaining and testing a native remote control of each media device. More specifically, the manufacturer can press the various buttons of the remote control while monitoring and recording the resulting signals emitted by the remote control, and thus obtain the remote control protocol. This procedure is similar to the one described in the prior art. However, in this case the procedure may be performed by professional engineers instead of customers, and only once for each supported media device.

Optionally, a list of identification keys is saved in addition to the remote control protocols. The identification keys are keys whose resulting codes may uniquely identify the remote control protocol for that device. The identification keys need not be keys that are specifically dedicated for identification. On the contrary it is preferred that the identification keys are keys that already exist on their respective remote controls and are only designated as identification keys for the purposes of the device identification process. For example, the <volume up> key of a remote control may be designated as an identification key. If more than one remote control protocols use the same code for <volume up>, a second identification key will be necessary to distinguish between these protocols. If two keys still do not uniquely identify a protocol, more identification keys may be saved. Predefining the identification keys is not required, because they can be determined by the controller during operation. This can be achieved by comparing the different saved protocols, and choosing a combination of keys, whose resulting codes can uniquely identify each protocol.

However, predefining the identification keys may potentially improve efficiency and ease of use. For example, large and distinctive identification keys (such as the volume and channel controls) may be chosen to avoid confusion by the user.

While unlikely, it is possible that a remote control protocol requires the pressing of several keys to send a single code. If this is the case, the combination of these several keys and the resulting code can be saved in the controller's data store. If necessary, such combination may be designated as an identification key, however this should be avoided, as it may result in user confusion.

Step 202 is performed after the user has obtained the controller and (preferably) has connected it to the user's media devices. The controller prompts a user to select a device type for identification. The controller may do this by using a television set attached to the controller, a computer or video monitor, or using the controller's display 116. Prompts may typically be audio, visual or both. Using a television set is preferable, as more visual space is available for instructing the user, and most user are familiar with TV operations. However in order for a television set to be used, the user must first configure the television set to display the audio visual data sent by the controller through connection 106.

Alternatively, display 116 may be used to provide instructions, or to guide proper setup of the TV set, which may thereafter be used to configure other devices. Once the television set is properly identified, the controller may configure the television set automatically. Then, the identification of the remaining devices may be performed by displaying user instructions at the television set.

The device type of the media device to be configured is selected from a menu listing one or more general device types which are compatible with controller 100. These may include, for example, "television set", "VCR/DVD player", "cable box", "sound system", etc. The user selects the device type using the controller remote 110.

Step 202 is optional and is used to narrow down the possible remote control protocols. For example, the controller would have to search for the correct protocol only among the various television remote control protocols and not among all media device remote control protocols.

Step 202 also ensures more flexibility with the selection of identification keys. If an identification key is to be used for a set of devices, the identification key should be present on all remote controls that are native for these devices. Thus, if the set of devices is broad, the choice of identification keys is narrow. For example, most sound system remote controls do not include a channel up key. Most television and VCR remote controls do not include the DVD menu keys. By dividing the set of all supported devices into general device types, step 202 narrows the possible remote controls that are used for each device type, and allows for a better selection of identification keys. A set of identification keys may be specifically defined for each device type. In addition, step 202 is not likely to cause confusion or errors, since most any user should be able to classify an media device as belonging to a general device type. That is, most users can distinguish between a television set and a VCR.

At step 204, the user is prompted to press an identification key. If a device type is specified, the identification key is chosen from the set of identification keys associated with that device type. For additional clarity, a picture of the identification key may be displayed on television set 101, or controller display 116. The user is instructed to pick up the native remote control of the device being identified, and press the identification key on that remote control. For example, if television set 101 is being identified, the user presses the specified identification key of remote control 111. Remote control 111 sends out a signal comprising a code. The code is associated by remote control 111 with the identification key. For example, if the identification key is the "channel up" key, and the remote control is a NEC remote controller, then the signal emitted by remote control 111 would have a carrier in the 40 KHz range, and the code comprised by the signal would be 42. The encoding would be binary with bits indicated by the duration of "on pulses" of the signal. An "on" pulse corresponds to the presence of IR radiation above a predefined threshold.

At step 206, controller 100 detects the signal emitted from remote control 111 and extracts the code comprised therein. Controller 100 then performs a search in its data store. If a type of device was previously selected, the search is limited to devices of that type. The search selects the protocols comprised in the controller's data store, which specify that the received code (e.g., code 42) should be used for the identification key that was prompted for last (e.g., the channel up key).

If the search results in no protocols, then the user is either utilizing an unknown device or he/she has made a mistake (i.e., pressed the wrong key). The flow of control proceeds to step 212, which is discussed in more detail below.

If the search results in more than one protocol, then the identification key was not sufficient to identify a unique protocol. The flow of control returns to step 204, where a new identification key is attempted. Subsequent searches are performed on the set of protocols that were returned by the previous search. Thus, after each new identification key press, the set of protocols being searched is narrowed down until a single protocol is left. Research on currently used media devices and their associated remote control protocols suggests that a well designed controller will typically only need to attempt two identification keys.

Once the search returns a single protocol, the user is asked to test the newly identified protocol (step 208). The user is prompted to use controller remote control 110 to control the newly identified device through controller 100. Thus, the user is prompted to input a command at controller remote 110, and determine whether the command had the desired effect on the device. For example, if the device is television set 101, the command may be to change channels. If the device is sound system 102, the command may be to change the sound volume. The command is relayed by controller remote 110 to controller 100. Controller 100 then sends the command through connection 107 to control transmitter 108. Control transmitter 108 sends the command to the device (e.g., television set 101). If the device's remote control protocol was correctly identified, the device should then perform the command (e.g. change channels).

The controller prompts the user to indicate whether the test was successful (step 210). The user makes that indication by using the controller remote 110. If the test was successful the flow of control proceeds to step 214. If the test was not successful, the flow of control proceeds to step 212. Steps 208, and 210 may be omitted in the interest of speed and simplicity. In that case, the flow of control proceeds directly to step 214 from step 206.

In step 214, the controller prompts the user to indicate whether there are any additional devices to be added. The user answers this question using the controller remote. If there are additional devices the flow of control returns to step 202. If there are no additional devices, the configuration is completed. Thus, in step 216 the controller loads the identified protocol and associates it with the respective device.

Subsequently when the user sends commands to that device through controller remote control 110, the controller will translate these commands into the identified protocol and send the translated commands to the device through the appropriate control transmitter 108. Furthermore, the controller may issue autonomous commands to the device, pursuant to more complex features of the controller. For example, the controller may automatically issue a recording command to a VCR in response to a previous request by the user. Furthermore, having determined which remote control protocol a device uses, the controller may use previously saved data to make a further determination as to the features of the device. The controller may then use these features to provide a better user experience. For example, if a television set features a picture-in-picture capability, the controller may allow the user to invoke that capability through the controller remote 110. These features are preferably implemented by saving the appropriate computer executable instructions in the controller memory and executing these instructions by a controller processor.

The controller may issue several commands to a single device as a result of a single command sent by the user through the controller remote 110. Furthermore, the controller may issue several commands to several different devices in response to single command sent by the user. In addition, the controller may also perform routing functions on the data streams being sent/received from the several devices in response to the single command. These are referred to as complex actions. For example, if a user presses a key on the controller remote that indicates the user's desire to watch a DVD, the controller may respond by turning on a DVD player, turning on a television set, routing a signal from the DVD player to the television set, instructing the DVD player to play, and instructing the television set to display the signal received from the DVD player.

In order to implement complex actions, the designers of the controller must first define a set of complex actions and the combinations of devices these actions are applicable to. The designers must then determine a list of commands the controller must send to the various devices in order to perform the complex action. The list of commands may be different for different combinations of devices. Thus, a single complex action may be associated with a plurality of lists of commands each corresponding to a specific combination of devices. Also, if applicable, the necessary data stream routing actions associated with each complex action are determined and placed in the list of commands. This information is saved in the controller's data store. The designers must then assign a button or combination of buttons on the controller remote 110 and a remote control code to each stored complex action.

The controller is provided with instructions which when executed by the controller's processor cause the controller to determine whether the combination of devices attached to it is compatible with any complex actions saved in its memory. This determination can be easily performed after the device identification process is completed, as the controller will then have identified all devices attached to it. The controller then selects the list of commands associated with the combination of devices attached to the controller. When the controller receives a remote control code associated with a complex action, it executes the action by sending the commands and/or performing the data stream routing actions included in the selected list.

Since the remote control protocol each device uses depends largely on the maker of the device and on the general model range of the device, a group of devices using the same remote control protocol are likely to have similar technical capabilities and features. These features and capabilities may be stored in the controller's data store. Thus, once the controller identifies the devices attached to it, it may interact with these devices based on the devices' technical capabilities and features. For example, after the controller identifies an attached television set as a particular model, it retrieves from its data store the features and capabilities of that model of television sets. It thus determines that the television set supports a certain format of digital signal. The controller may then send digital signal of this format to the television set. This will allow the controller to extract the optimum performance of the attached devices without requiring the user to perform any additional configuration steps.

Step 212 is triggered if a search results in zero protocols, or if after a single protocol has been identified, that protocol fails the test of step 208. Thus, step 212 is used if a protocol is incorrectly identified, or if no protocol can be identified. This may be due to user error, or due to the fact that the protocol being tested is not saved in the controller data store.

Several different actions may be taken at step 212. The user may be requested to repeat the device identification process for the same device. Thus, if any user errors contributed to the initial incorrect identification, the device may be subsequently correctly identified. Alternatively, or after repeating the identification process is not successful, the user may direct the controller to download additional device data. The optional ability to download additional data is discussed in more detail below. In another alternative, the controller may request that the user "teach" the controller a new device in a manner similar to that described in the prior art. More specifically, the controller may request the user to enter a generalized device type (such as "television") and then request the user to press a button on the device remote control for each of a list of predefined functions that are considered common or required for that device type. The controller saves the received signals and creates a new data entry of actions and corresponding signals for that device. Thus, the controller "learns" all or part of the unknown device protocol.

Figure 3:
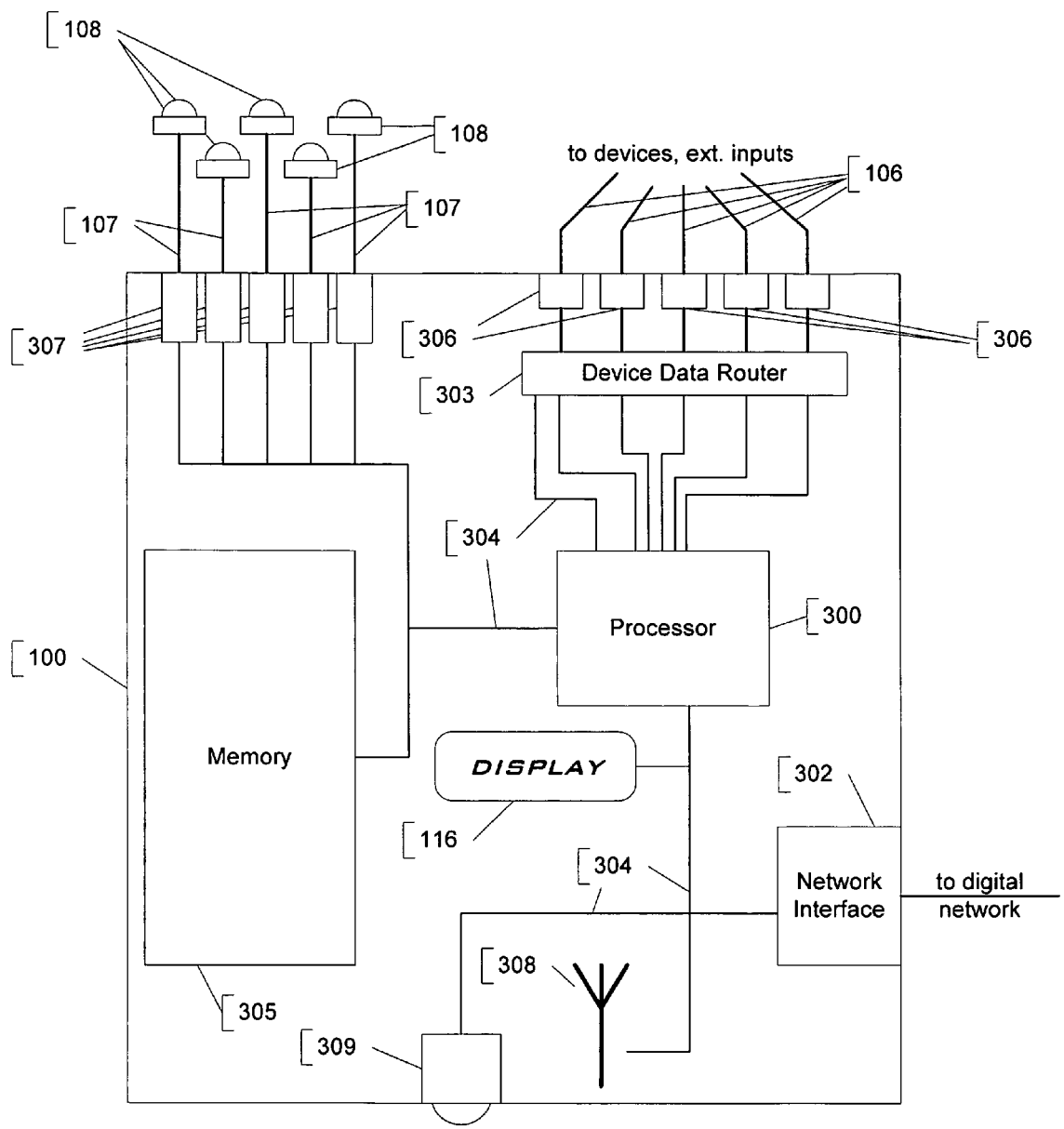
FIG. 3 is a diagram of the controller.

FIG. 3 is a diagram of the controller 100. A processor 300 is connected to various other components through one or more connections 304. Connections 304 may include one or more buses which comprise a plurality of parallel connections.

Memory 305 stores operating instructions for the processor as well as various other data. It can comprise volatile and/or non-volatile memory modules. Thus, memory 305 may comprise read only memory (ROM), random access memory (RAM), flash memory, hard drive, and others. It is preferable that at least one writable memory module is present. It is also preferable that at least one non-volatile module is present, which is used to store data and instructions, when power is off. The contents of memory 305 are described in further detail below.

A plurality of control interfaces 307 communicate with the controller transmitters 108 through control connections 107. If the control connections are wireless, control interfaces 307 include antennas, infrared transmitters or other suitable means for wireless communication. The control interfaces may modify control signals received from processor 300 in order to place the signals in a form suitable for transmission.

Data interfaces 306 are connected to the attached devices (not shown) through data connections 106. In addition, data interfaces may 306 be connected to an external audio visual input, such as an antenna, a cable television input, or a satellite television input. Data interfaces 306 are also connected to the processor 300 which controls and/or modifies various data streams traveling between devices. As described above, the data streams may be, for example, video and audio streams. Optionally, a data stream distributor 303 may be used to send the various data streams between the data interfaces. The use of a data stream distributor allows for streams to be routed without being directly sent through the processor. Thus, delays are avoided and the processor is not burdened. Furthermore, the data stream distributor 303 may route analog data streams, without necessitating the digitizing of these streams. Preferably, the processor 300 sends instructions to the data stream distributor 303 through connection 304.

More than one data interfaces 306 and associated data connections 106 may be used for a single device. For example, many modern television sets include several inputs. The various television set inputs are used for connections (such as cables) of different types which carry data in different formats. The controller may use two or more data interfaces to connect to the different inputs of a single television set. Thus, the controller is able to route data to the television set in the most suitable format. For example, data received in a digital format may be routed in digital form to the television set's digital input.

One or more control receptors (308 and 309 in FIG. 3) are configured to receive signals from device remote controls 111-115, as well as the controller remote 110. Thus, the control receptors should be of types compatible with these remote controls. In the preferred embodiment, an infrared control receptor 308 and a radio frequency (RF) control receptor 309 are used. Receptor 309 receives signals from the controller remote 110, while receptor 308 receives signals from the various device remotes. The choice of these receptors is due to the fact that most currently available device remotes use infrared communication, and may be changed if needed. It is not necessary that a separate receptor be used for the controller remote 110. Receptors 308, 309 are connected to processor 300 by connection 304 and include any circuits necessary to convert the received signals into signals that are suitable for transmission over connection 304.

Optional network interface 302 connects the controller to a digital network. The network interface may comprise a network interface card (NIC). Alternatively, or in addition the network interface may also comprise a wireless network card. The digital network may include a local area network (LAN), a wide area network (WAN), or a combination of networks, such as the Internet. The network interface 302 may be used by the controller to offer various features to the user. These features are described in more detail below.

An onboard display 116 is also optionally included and connected to the processor 300.

Figure 4:
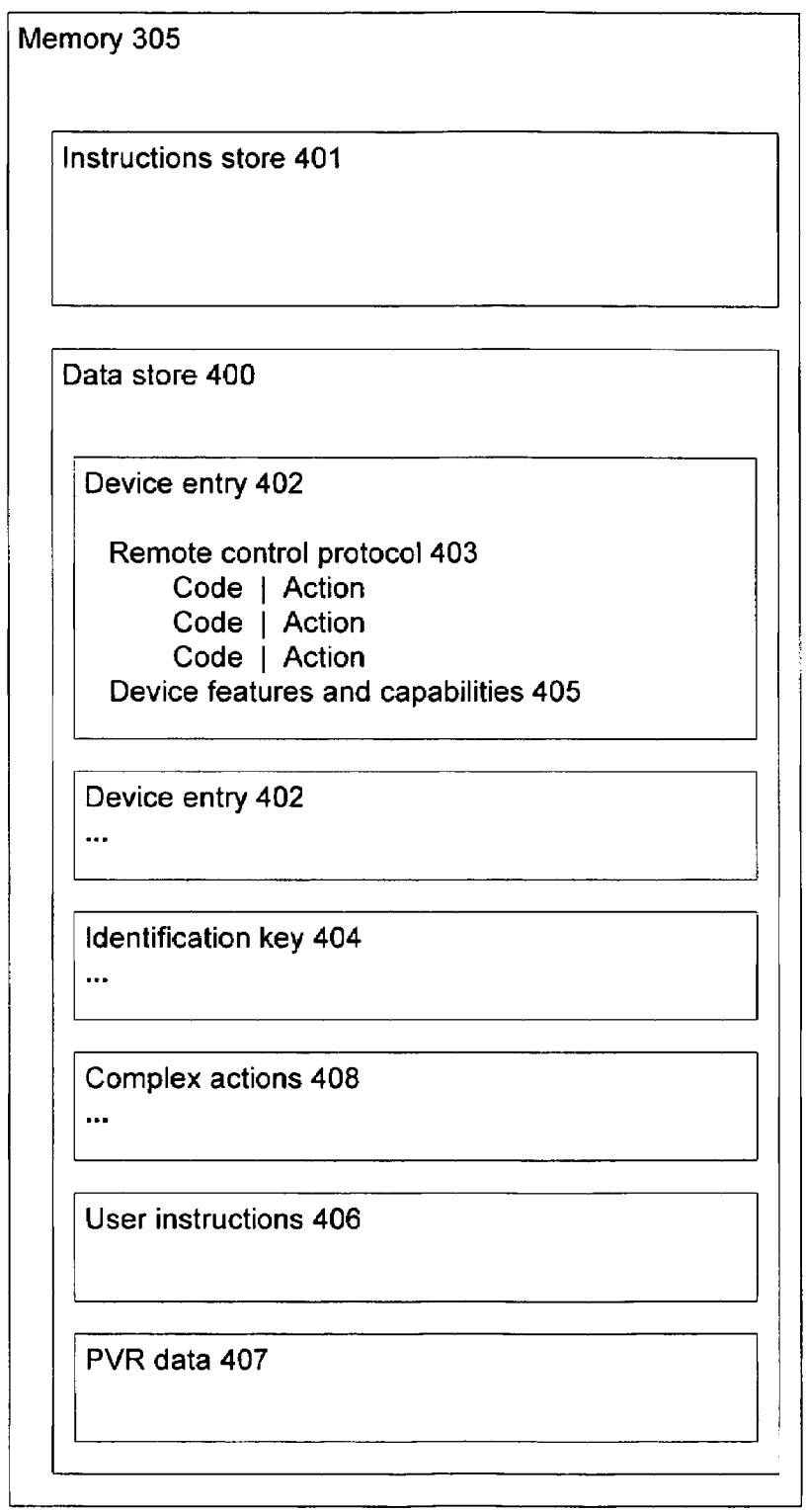
FIG. 4 is a logical diagram of the memory of the controller.

FIG. 4 is a diagram of memory 305. Since FIG. 4 is a logical diagram, various elements shown therein need not represent physical modules in the memory, or data that appears in proximate locations in the memory. Furthermore, if memory 305 includes several modules, such as, for example, a ROM, a RAM and a hard drive, the various elements of FIG. 4 may be stores in one or more of these modules.

Instructions store 401 includes various instructions for the operation of processor 300. Preferably, at least some of the instructions are stored in non volatile memory, such as ROM, PROM, or EPROM, in order to allow the controller to operate after interruptions of power.

Data store 400 includes various data needed for the operation of the controller. The data store designation refers to any structure for storing data. It may include various structures that are known in the art, such as, for example, a simple sequential list, a table, or even a relational database.

Data store 400 features one or more device entries 402. Each device entry is associated with a device which is supported by the controller 100 (such as devices 101-105). A device entry includes remote control protocol data 403, which describes the remote control protocol used by the respective device. The remote control protocol data may be in the form of multiple entries of codes, which are associated with codes emitted by the native remote control, and actions, which are the actions the device is expected to perform after receiving the respective codes.

The device entry may also include data defining one or more features or capabilities of the device. These may include features such as picture-in-picture capability, ability to play various sound formats, or performance metrics, such as a resolution of a screen, or a tolerance of a set of speakers. Some device features may not be explicitly stored, because their existence is implied by the presence of a corresponding remote control code. For example, the ability of a television set to display close captioning may be indicated by the presence of the appropriate code in the remote control protocol 403. The controller uses the device features data in order to allow the user to invoke these features through the controller by using the controller remote 110. The device feature data may also be used, as described above, to tailor the data and/or commands sent to the various devices in order to ensure optimum performance of the devices.

The data store also includes data identifying one or more complex action 408. The complex actions are features that the user would not have been able to invoke with a single remote control command, if he/she were directly operating the devices. Thus, a complex action may include reviewing an electronic channel guide, in order to determine when and on which channel certain programs are shown, and then recording these programs. Other such actions may include automatically changing the settings for a television set 101 according to the type of device that is used in connection with the television set 101. Complex actions are described in more detail above.

The data store also includes information 404 defining one or more identification keys. The use of identification keys is described in detail above. As described above, identification keys may be associated with general device types which correspond to one or more specific device entries.

It is preferred that the data store 400 is preloaded with device entries associated with all supported devices before it is delivered to customers. If the controller "learns" a new remote device protocol (see discussion of step 212 of FIG. 2 above), the controller saves the newly learned device protocol in a new device entry. Furthermore, the controller may download and save new device entries, as described below.

Data store 400 may also include other elements, such as user instructions 406. User instructions, are instructions on the use of the controller and may include various prompts, descriptions of features, error messages, trouble shooting instructions, graphic or audio instructions, etc.

Additionally, if the controller includes or is connected to a personal video recorder (PVR), PVR data may be stored as well. PVR data includes digitally recorded video and audio data. The functions and structure of PVRs are known in the art.

Figure 5:
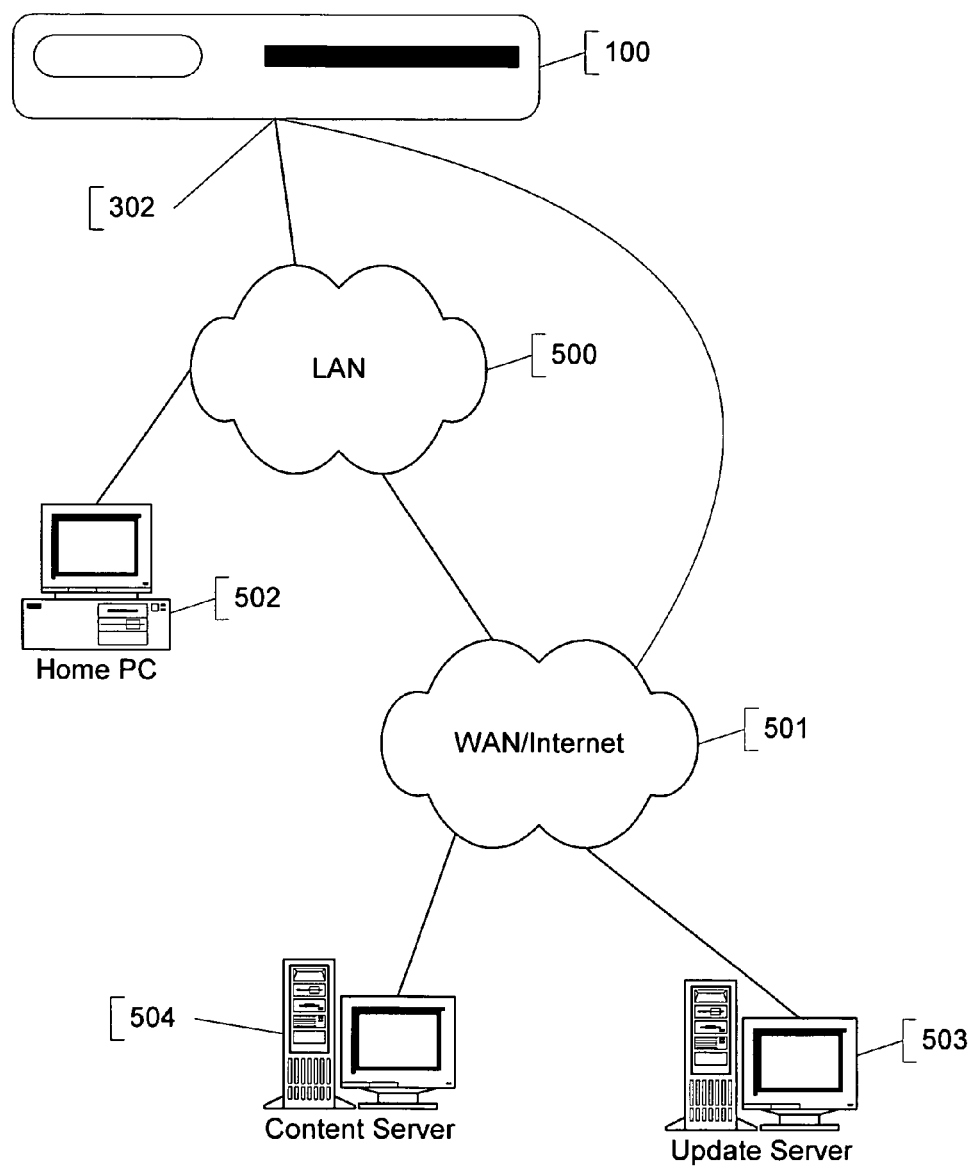
FIG. 5 is a diagram showing the controller connected with various computers through digital networks.

FIG. 5 illustrates some of the digital networking functionality of the controller. Controller 100 is connected to LAN 500 through the controller's network interface 302. This connection may be wired or wireless. It is expected (but not required) that a typical LAN configuration is a home computer network. A computer 502 is also connected to the LAN 500. Computer 502 is likely to be a desktop home computer, as illustrated. However it may be any other computer or computing device, such as a server, PDA, laptop, telephone having computing functionality, etc.

The controller may interact with computer 502 in order to allow the user to view digital pictures, video and play music or other audio which is stored at the computer 502. The user may invoke this functionality through controller remote 110. Furthermore, the controller may allow the user to browse for content stored at computer 502, by displaying a listing of that content at television set 101. In a another embodiment, the controller may allow the user to directly interact with and send commands to computer 502 by using controller remote 110 and television set 101 as interfaces. This functionality may be realized by loading dedicated software at computer 502, or by using already existing remote login features of the operating system of computer 502.

The controller may also be connected to WAN 501. Wide area network 501 may be the Internet. As shown in FIG. 5, the connection to WAN 501 may be indirect (i.e., through LAN 500), or direct. Also, this connection may be wired or wireless.

Controller 100 may access various other computing devices through WAN 501. For example, the controller may access content server 504 in order to deliver pictures, video, and/or audio to the user in a manner similar to the manner described above in connection with computer 502. Furthermore, the user may interact with content server 504 utilizing the controller remote 110 and television set 101 as described above. In addition, the controller may allow the user to access various WAN and/or Internet resources, by using known network and/or Internet protocols, such as, for example, web sites. The controller may include a browser for requesting, receiving and displaying websites. Alternatively, the controller may initiate a browser at home computer 501 and receive from computer 501 the video data generated by that browser.

In addition, the controller may connect to an update server 503 in order to download updates to its software, or additional data. Preferably, the update server 503 is administered by the manufacturers of the controller 100, and is used to enhance the value of the controller by keeping its software and data current. The controller may periodically access update server 502 based on a previously saved internet protocol (IP) address of that server in order to check if any updates are available. In addition, the update server may notify the controller when updates are available.

The update server may store newly obtained remote control protocols. Thus, the controller may download and store remote control protocols that have not been initially stored in its data store 400. The controller, may attempt to download additional remote control protocols, when the device identification procedure fails (see step 212, FIG. 2).

The controller may obtain other useful data from update server 503, such as, for example, program guides. The controller may also send data to the update server, which relates to various operation metrics and usage statistics of the controller. These may be used to detect problems with the controller, or for marketing or other research purposes.

Local area network 500 and/or WAN 501 may comprise the digital network 109 shown in FIG. 1.

While fundamental novel features of the invention as applied to several embodiments have been shown and described, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

I claim:

1. A system for identifying and controlling one or more media devices comprising:
   a controller, the controller including:
   one or more control receptors configured to receive signals from one or more native remote controls;
   a processor connected to the control receptors;
   a memory connected to the processor, the memory including one or more device entries, each device entry including information describing a remote control protocol associated with at least one of the native remote controls;
   the memory further including a code for at least one predefined identification key associated with the one or more native remote controls and also including computer executable instructions, which when executed by the processor cause the controller to receive one or more signals from one of the native remote controls through the control receptors, and identify the media device associated with the native remote control based on the received signal, and the one or more device entries;
   wherein each predefined identification key is a specific key of the native remote control that is only designated as the identification key for purposes of the process of uniquely identifying the media device associated with the native remote control, the one or more identification keys of the native remote control being less than the entire set of keys and being the only keys that can uniquely identify the media device.

2. The system of claim 1, wherein the instructions further cause the controller to:
   extract a code from one of the received signals; and
   find the code in the information describing a remote control protocol in the one or more device entries.

3. The system of claim 2, wherein the instructions further cause the controller to request that a user press one of the one or more identification keys on the native remote control.

4. The system of claim 3, wherein the one or more media devices comprise a television set connected to the controller, and wherein the request is displayed on the television set.

5. The system of claim 1, further including
   a controller remote control; and
   one or more control transmitters, each connected to the controller and one of the one or more media devices.

6. The system of claim 5, wherein each remote control protocol is also associated with one of the one or more media devices and the instructions further cause the controller to:
   receive a second signal from the controller remote control;
   translate the second signal into a native remote protocol associated with one of the one or more media devices, based on the a description of the native remote protocol stored in the memory; and
   send the translated second signal to the media device through the control transmitter connected to the media device.

7. The system of claim 6, wherein the instructions further cause the controller to issue a plurality of commands to at least one of the one or more media devices through at least one of the one or more control transmitters as a result of a single command issued by a user through the controller remote control.

8. The system of claim 7, wherein the plurality of commands include commands sent to at least two media devices.

9. The system of claim 6, further comprising one or more data interfaces, each connected to at least one of the one or more media devices.

10. The system of claim 9, wherein the controller is configured to selectively route data between the media devices through the one or more data interfaces.

11. The system of claim 10, wherein the instructions further cause the controller to issue a plurality of commands to at least two of the media devices through at least two of the control transmitters and route data between the at least two media devices as a result of a single command issued by a user through the controller remote control.

12. The system of claim 10, further comprising a data stream distributor for routing the data communicated through the data interfaces without sending that data directly to the processor.

13. The system of claim 1, further comprising a network interface.

14. The system of claim 13, wherein the instructions further cause the controller to communicate with a server through the network interface and download an update.

15. The system of claim 14, wherein the update comprises an additional device entry, the additional device entry defining an additional remote control protocol.

16. The system of claim 2, wherein each device entry further comprises data describing one or more device features and capabilities of the corresponding device, and wherein the instructions further cause the controller to interact with one or more identified devices based on the data describing the features and capabilities of the identified devices.

17. The system of claim 16, wherein the instructions further cause the controller to send a command to an identified device based on the data describing the features and capabilities of the identified device.

18. The system of claim 16, wherein the instructions further cause the controller to send a data stream to an identified device in a format based on the data describing the features and capabilities of the identified device.

19. The system of claim 1, wherein each native remote control is associated with one of the one or more media devices.

20. A method for identifying a first media device having an associated first remote control protocol by using a native remote control, the method comprising:
predefining one or more remote control identification key codes at a controller;
associating one or more identification keys with the identification key code, wherein each designated identification key is a specific key of the native remote control that is only designated as the identification key for purposes of a process of uniquely identifying the media device associated with the native remote control, the identification key of the native remote control being less than the entire set of keys for the native remote control;
receiving, at the controller, a signal from the native remote control as a result of a press of a designated key;
requesting the user to press an identification key as the designated key;
comparing the signal with the one or more predefined remote control identification key codes; and
identifying at least one remote control protocol that is compatible with the signal.

21. The method of claim 20, further including the step of repeating the receiving, comparing, and identifying steps until the first remote control protocol is identified as compatible with all the received signals.

22. The method of claim 20, wherein the requesting step is performed by displaying a request at a television or video monitor in communication with the controller.

23. The method of claim 21 further comprising the steps of:
receiving a command at the controller from a controller remote, according to a command protocol associated with the controller;
translating the command to a corresponding command according to the first remote control protocol; and
sending the command to the first media device.

24. The method of claim 21, further comprising the steps of:
identifying a second media device;
associating a second remote control protocol with the second media device;
receiving a command at the controller from a controller remote, according to a command protocol associated with the controller;
converting the command into a first and second commands by the controller, the first and second commands being expressed in the first and second remote control protocols respectively;
sending the first and second commands to the first and second devices, respectively by the controller.

25. The method of claim 24, further including forwarding a data stream between the first and second media devices as a result of the command.

26. The method of claim 20, further comprising the following steps performed by the controller:
connecting to a remote server; and
receiving additional remote control protocols from the remote server.

27. The method of claim 21, further comprising the steps of:
predefining data describing the features and capabilities of one or more devices;
identifying at least one device that is associated with an identified remote control protocol, wherein the data describing features and capabilities includes data describing features and capabilities of the identified device;
interacting with the at least one identified device based on the data describing the features and capabilities of the identified device.

28. The method of claim 27, wherein the interacting step further includes sending a command to the identified device based on the data describing the features and capabilities of the identified device.

29. The method of claim 27, wherein the interacting step further includes sending a data stream to the identified device in a format based on the data describing the features and capabilities of the identified device.

30. The method of claim 20, wherein the native remote control is associated with the first media device.

31. A method for identifying a media device having an associated remote control protocol and an associated native remote control, the method comprising:
predefining one or more remote control identification key codes at a controller;
selecting a device type of the media device from a menu;
receiving a signal from the native remote control as a result of a press of a designated key; and
comparing the signal with the one or more predefined remote control identification key codes to determine how many remote control protocols are compatible with the received signal, wherein the signal is only compared with the identification key codes that belong to the selected device type of the media device.

32. The method of claim 31, further comprising:
upon determination that one remote control protocol is compatible with the received signal, identifying the media device as a device compatible with the one remote control protocol.

33. The method of claim 31, further comprising:
upon determination that a plurality of remote control protocols are compatible with the received signal, repeating the receiving and comparing actions until only one remote control protocol is determined to be compatible with all the received signals; and identifying the media device as a device compatible with the one remote control protocol.

34. The method of claim 31, wherein the menu includes a listing of one or more general device types which are compatible with the controller and the user selects the device type with a controller, the controller searching remote control protocols that only belong to the selected device type and not among all media device remote control protocols.

* * * * *